United States Patent
Duriseati et al.

(10) Patent No.: US 11,095,637 B2
(45) Date of Patent: Aug. 17, 2021

(54) INTERFACE FOR TELECOMMUNICATIONS BY DESKTOP NATIVE APPLICATIONS

(71) Applicant: T-MOBILE USA, INC., Bellevue, WA (US)

(72) Inventors: Svnn Mahesh Duriseati, Bellevue, WA (US); Prakasa Bellam, Bellevue, WA (US); Husain Mahmood, Bellevue, WA (US); Mikhail Fridman, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 213 days.

(21) Appl. No.: 16/542,516

(22) Filed: Aug. 16, 2019

(65) Prior Publication Data

US 2021/0051141 A1    Feb. 18, 2021

(51) Int. Cl.
    *H04L 29/06*    (2006.01)
(52) U.S. Cl.
    CPC ........ *H04L 63/083* (2013.01); *H04L 65/1069* (2013.01); *H04L 65/1096* (2013.01); *H04L 65/1006* (2013.01)
(58) Field of Classification Search
    None
    See application file for complete search history.

(56) References Cited

U.S. PATENT DOCUMENTS

| | | | | |
|---|---|---|---|---|
| 9,565,212 | B2* | 2/2017 | Faltyn | H04W 12/06 |
| 2012/0240211 | A1* | 9/2012 | Counterman | H04L 9/321 |
| | | | | 726/9 |
| 2013/0263212 | A1* | 10/2013 | Faltyn | H04L 63/20 |
| | | | | 726/1 |
| 2014/0282990 | A1* | 9/2014 | Engelhart | H04L 63/08 |
| | | | | 726/9 |
| 2019/0281107 | A1* | 9/2019 | Banerjee | G06Q 20/34 |
| 2019/0320038 | A1* | 10/2019 | Walsh | G06F 16/9574 |

* cited by examiner

*Primary Examiner* — Joshua Joo
(74) *Attorney, Agent, or Firm* — Marshall, Gerstein & Borun LLP

(57) ABSTRACT

Systems and methods of providing third-party applications with access to functionalities of a proprietary communication network via a network as a service (NaaS) software development kit (SDK) are disclosed. The NaaS SDK includes a web authentication broker and a WebSocket handler, and may include additional modules to facilitate network access. The NaaS SDK authenticates the user account and establishes a communication connection with the proprietary communication network, which is then used to further access functionalities of the proprietary communication network. The communication connection may be used to establish media connections for specific communication sessions over the proprietary communication network, such as making or receiving voice calls.

20 Claims, 10 Drawing Sheets

INTERFACE FOR TELECOMMUNICATIONS BY DESKTOP NATIVE APPLICATIONS

FIELD OF DISCLOSURE

The present disclosure generally relates to systems and methods for providing third-party applications with secure access to functionalities of a proprietary communication network via application program interfaces of a software development kit.

BACKGROUND

Existing proprietary communication networks have become an integral facet of modern society. Proprietary communication networks provide and facilitate the infrastructural backbone for a wide variety of communication platforms and information delivery systems. For example, these communication networks enable and support voice calls, video chatting, text messaging, e-mailing, media streaming, and other forms of information exchange. Accordingly, proprietary communication networks allow people, regardless of physical location, to have access to information and communicate with others.

As a result of such technological advancement, a variety of different operating systems, software platforms, applications, devices, etc., have been created. However, many of these technologies function in different manners to solve certain problems and/or to offer certain benefits. Additionally, users may prefer or be partial to a certain company/brand, operating system, user experience, or interface. Thus, it is desirable to enable third-party applications to use communication networks in order to meet user demand. Nevertheless, these third-party applications must be configured to use the proper network protocols to use communication networks and properly function.

While third-party applications exist that use communication networks, it has been necessary for these third-party applications to implement over-the-top ("OTT") communication services that transmit and receive electronic communication data as ordinary data sent over the top of the proprietary communication network, rather than using the more specialized native functionalities of the proprietary communication network. Third-party applications are not typically permitted to directly access core functionalities of proprietary communication networks because such access exposes the proprietary communication network to security, intellectual property, and/or marketplace risks. Thus, third-party applications are limited to using OTT communication, which is data-exchange intensive, slower, less reliable, and less secure than other communication techniques.

SUMMARY

The present application discloses a method, system, and computer-readable medium storing instructions for securely providing access to functionalities of a proprietary communication network to third-party applications through a network as a service software development kit ("NaaS SDK"). Such techniques overcome the limitations of existing OTT techniques by providing access to network-native functionalities without exposing network communication directly to the third-party applications. The method, system, or instructions may include receiving a request at a client device to establish a communication connection with the proprietary communication network from a third-party application running on the client device; accessing a NaaS SDK; obtaining an access token associated with a user account at the NaaS SDK by transmitting an authentication request to a network gateway and receiving the access token from the network gateway; registering a service line associated with the user account by transmitting a service line selection request to the network gateway; and/or establishing a communication channel associated with the service line between the client device and the network gateway.

The communication channel may provide real-time access to one or more functionalities of the proprietary communication network through the network gateway using the access token. For example, the communication channel may provide access to voice telephony communication via a telephony functionality of the proprietary communication network. Establishing the communication channel may include establishing a WebSocket session with a channel address of an endpoint associated with the network gateway. The NaaS SDK may further establish media connections for inbound or outbound calls, video streams, or text messaging via the communication channel.

In some embodiments, the NaaS SDK may comprise a plurality of components, units, or modules. A WebSocket handler of the NaaS SDK may be configured to establish the communication channel, such as by establishing a WebSocket session with a channel address of an endpoint associated with the network gateway. The NaaS SDK may further include a poller configured to keep such WebSocket session open by polling the proprietary communication network at intervals. The NaaS SDK may also include a signal handler configured to manage communication signal interchange for communication via a media connection according to protocols used by the proprietary communication network, such as a media connection for real-time communication using the one or more functionalities of the proprietary communication network.

A web authentication broker of the NaaS SDK may be configured to obtain the access token and register the service line. In some embodiments, obtaining the access token may include: receiving user credentials associated with the user account from a user of the client device; sending a login message to an enterprise user interface (EUI), the login message including the user credentials; receiving from the EUI an authorization code for the user account; transmitting the authentication request including the authorization code to the network gateway through an application program interface (API) gateway; and/or receiving the access token from the network gateway through the API gateway. The access token may be associated with the client device and a communication session. Likewise, in some embodiments, registering the service line may include: sending a request for a list of available service lines associated with the user account to an API gateway; receiving the list of available service lines from the API gateway; presenting the list of available service lines to a user of the client device to a user via a user interface; receiving a selection from the user of the service line; and/or registering the selected service line.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The present disclosure generally relates to systems and methods for providing access to a proprietary communication network to third-party applications through network as a service ("NaaS") communication. Such access is provided using application program interfaces ("APIs"), as discussed further herein, to provide access to native functionalities of the proprietary communication network to third-party applications of client devices, without exposing the communication protocols of the proprietary communication network to the third-party applications. Thus, unaffiliated third-party applications running on a client device may access the functionalities of the proprietary communication network, without exposing the proprietary communication network to unauthorized access or other security threats.

According to certain embodiments, the systems and methods may support a dynamic, real-time, or near-real-time communication using the core services and functionalities of a proprietary communication network, such as telecommunications operator networks. Additionally, the present disclosure enables a third-party application to implement the communication network services, features, and functionalities in a manner that is customizable to the requirements or preferences of users of the third-party application.

As used herein, the term "functionalities" refers to communication services or features offered by a proprietary communication network, such as telephonic, text messaging, e-mailing, media streaming, and other similar services of a proprietary communication network.

Figure 1A:
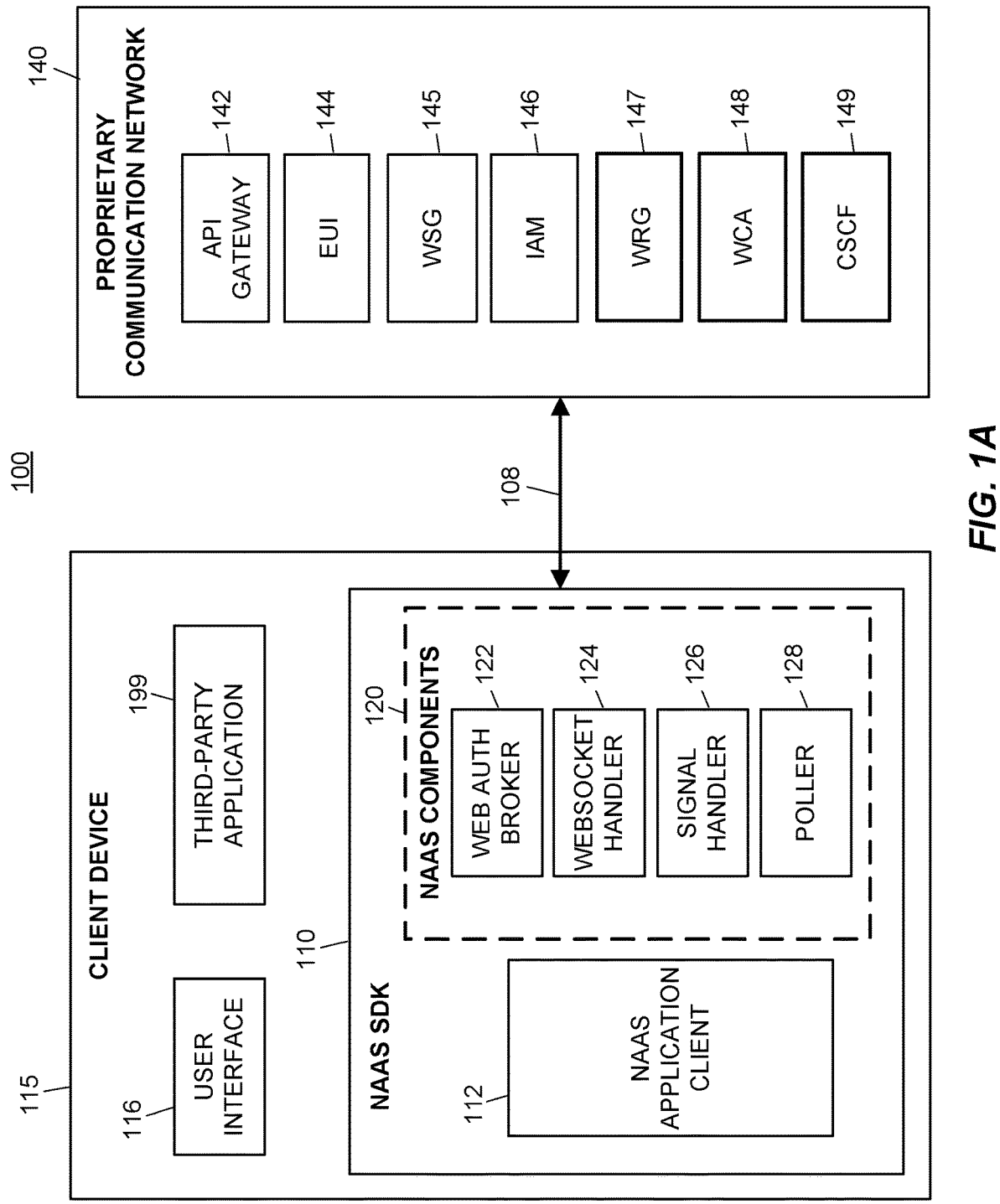
FIGS. 1A-B illustrate block diagrams of an exemplary system configured to enable NaaS communication that allows a third-party application of a client device to access functionalities of a proprietary communication network through a NaaS SDK.
Figure 1B:
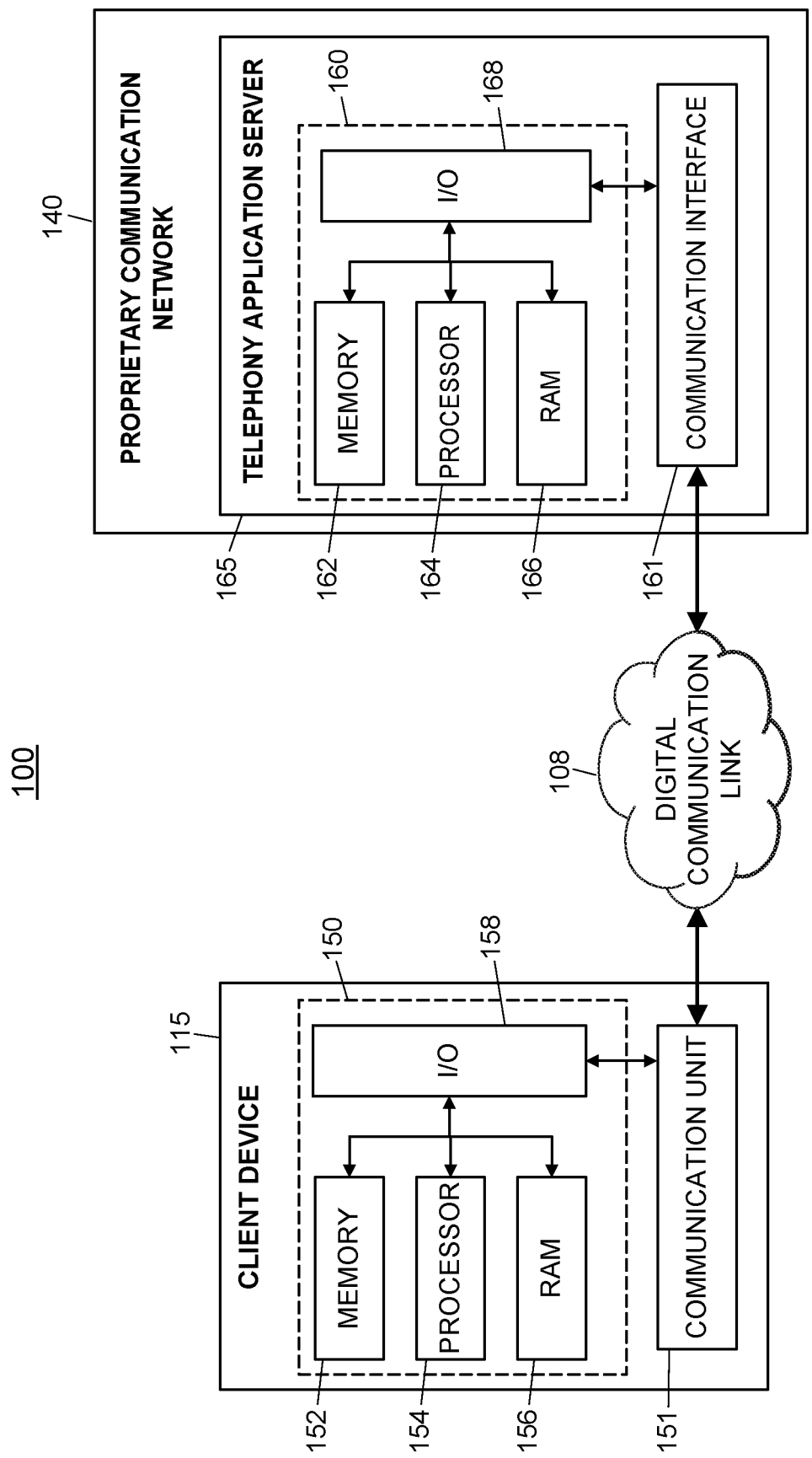

FIGS. 1A-B illustrate block diagrams of an exemplary system 100 for NaaS communication, as described further herein. FIG. 1A illustrates a block diagram of the system 100 configured to enable NaaS communication that allows a third-party application 199 of a client device 115 to access functionalities of a proprietary communication network 140, showing functional blocks within the client device 115 and network components of the proprietary communication network 140. The client device 115 includes a NaaS software development kit ("NaaS SDK") 110 that handles communications with the proprietary communication network 140 without exposing the full communication protocols of the proprietary communication network 140 to the third-party application 199. This improves network security by avoiding exposure of low-level commands to third parties (e.g., application developers) and improves network reliability by allowing updates to the NaaS SDK 110 without requiring changes to the third-party applications 199 (of which there may be thousands, each managed by separate third-party developers). Separating communication protocol handling from both the proprietary communication network 140 and the third-party application 199 further improves operation of the third-party application 199 by enabling use of native functionalities of the proprietary communication network 140, rather than approximating such functionalities with inefficient over-the-top ("OTT") communication services running in a separate layer on top of the proprietary communication network 140.

The system 100 includes both hardware and software applications, as well as various data communication channels for communicating data between the various hardware and software components. The system 100 may be divided into front-end components (i.e., the client device 115) and back-end components (i.e., the proprietary communication network 140 and its various components). These front-end components and back-end components are connected by a digital communication link 108. The digital communication link 108 may include one or more digital communication connections through the Internet, a local network, a virtual private network, or some other type of data network. In embodiments in which the digital communication link 108 includes the Internet, data communication may take place over the digital communication link 108 via an Internet communication protocol. It should be appreciated that in some embodiments, the digital communication link 108 may be, or may be a part of, the proprietary communication network 140.

The client device 115 may be any electronic device, such as a desktop computer, a notebook computer, a tablet computer, a smartphone, wearable electronics, a personal digital assistant, or a home assistant. The client device 115 may be configured to implement a variety of functions defined by hardware or software of the client device 115, including pre-installed applications and user-installed applications. To perform user-requested operations, the client device 115 includes a user interface 116 ("UI"), which may include hardware or software components configured to present information to the user and/or receive inputs from the user. In some embodiments, the UI 116 may be a touchscreen display configured by signals provided by software and hardware of the client device 115 to present information to the user and receive data input by the user. Unless otherwise required by context, references herein to the UI 116 may refer to hardware components facilitating interaction of the user with the client device 115 or software interfaces for facilitating information presentation or information receipt, such as a software-defined graphical user interface ("GUI").

Additionally, the client device 115 includes one or more third-party applications 199 configured to perform various actions when executed by a processor of the client device 115. Third-party applications 199 may include operating systems or platforms, such as the Universal Windows Platform developed by Microsoft Corporation, as well as software applications running on such operating systems or platforms. Each third-party application 199 must be configured to access, call, or communicate with the NaaS SDK 110 in order to access the functionalities of the proprietary communication network 140. For example, a third-party application 199 may be a special-purpose software application configured to provide telephony functionalities (e.g., voice or video calling) on a computing device via an Internet protocol communication connection. Because the NaaS SDK 110 handles access to and communicating through the proprietary communication network 140, the third-party application 199 may access one or more functionalities of the proprietary communication network 140 without requiring proprietary communication details for the proprietary communication network 140. In this way, the third-party application 199 may also be prevented from directly accessing the functionalities of the proprietary communication network 140, thus improving network security.

The client device 115 includes the NaaS SDK 110 configured to provide access to the proprietary communication network 140 to one or more third-party applications 199 and/or the UI 116. In some embodiments, the NaaS SDK 110 includes a NaaS application client 112 for communication with the third-party applications 199 and/or the UI 116. The NaaS application client 112 serves as an application program interface ("API") for receiving commands from the third-party applications 199 and/or the UI 116 to access or use functionalities of the proprietary communication network 140. The NaaS application client 112 also provides responsive communication back to the third-party applications 199 and/or the UI 116. The NaaS application client 112 thus serves as the interface between third-party applications 199 and the NaaS SDK 110 (and, through the Naas SDK 110, to the proprietary communication network 140). The NaaS SDK 110 also includes various NaaS components 120 for establishing, maintaining, and using a communication connection with the proprietary communication network 140. The NaaS components 120 are not directly visible to the third-party applications 199, instead being accessed through the NaaS application client 112.

The NaaS components 120 may include a plurality of subroutines for handling communication with the proprietary communication network 140. In some embodiments, the NaaS components 120 includes a web authentication broker 122 (configured to authenticate a user account to establish a communication session and access the proprietary communication network 140), a WebSocket handler 124 (configured to establish and maintain a WebSocket communication session with the proprietary communication network 140), a signal handler 126 (configured to manage communication signal interchange according to protocols used by the proprietary communication network 140), and a poller 128 (configured to keep the WebSocket communication session open by polling the proprietary communication network 140 at intervals). Together, the NaaS components 120 handle proprietary network communication by sending and receiving messages or signals between the client device 115 and the proprietary communication network 140. Handling proprietary network communication may include controlling components of the client device 115 to send messages to components of the proprietary communication network 140 via the digital communication link 108, as well as receiving messages received from components of the proprietary communication network 140 via the digital communication link 108. As discussed further below, the NaaS components 120 of the NaaS SDK 110 may obtain an access token upon authentication of a user account, which access token may be persisted and used by the NaaS components 120 to access the proprietary communication network 140.

The proprietary communication network 140 provides one or more network-native communication functionalities for telecommunications between user equipment, such as voice or video calls between users of the proprietary communication network 140. In some embodiments, the proprietary communication network 140 may be a telecommunications network providing voice and data communication between service subscribers having accounts with the operator of the proprietary communication network 140 (or with operators of interconnected proprietary communication networks). The proprietary communication network 140 includes a plurality of components to receive, send, process, generate, and route data between end users and among components of the proprietary communication network 140. Although only relevant components of the proprietary communication network 140 are illustrated, a person of ordinary skill in the art will understand additional components may be included to facilitate communication. Additionally, although illustrated as separate components, some or all of the components of the proprietary communication network 140 may be combined in various combinations in various embodiments.

In the some embodiments, the proprietary communication network 140 includes an API gateway 142, an Enterprise User Interface (EUI) 144, a web service gateway (WSG) 145, an Identity Access Management (IAM) 146, a WebRTC gateway (WRG) 147, a WebRTC communication adapter (WCA) 148, and a call session control function (CSCF) 149. The API gateway 142 is configured to provide access to the proprietary communication network 140 to the client device 115, including serving as a pass-through gateway to the proprietary communication network 140 following authentication and registration. The EUI 144 is configured to authenticate user accounts associated with the proprietary communication network 140 based upon user credentials. The WSG 145 is configured to maintain and provide information regarding the status of service lines. The IAM 146 is configured to manage device access to the proprietary communication network 140, including providing access tokens and enforcing access policies. The WRG 147 is configured to connect the client device 115 to the native functionalities of the proprietary communication network 140 via a WebRTC API in order to enable direct real-time audio, video, or other data channels between user devices. The WCA 148 is configured to adapt communication for the WRG 147 to establish communication connections and facilitate service line registration. The CSCF 149 is configured to process communication signals within an IP Multimedia Subsystem (IMS) of the proprietary communication network 140. These components of the proprietary communication network 140 may be accessed and used (directly or indirectly) by the NaaS SDK 110 to establish communication connections and implement network functionalities for network-native communications, as described further below.

FIG. 1B illustrates an additional block diagram of the exemplary system 100, showing further details of certain hardware components within the system 100. As discussed above, the exemplary system 100 includes the client device 115 and the proprietary communication network 140, which are communicatively connected via the digital communication link 108. Among other components, the proprietary communication network 140 includes a telephony application server ("TAS") 165, which may be configured to implement portions of the methods disclosed herein. Although only one client device 115 and one TAS 165 are illustrated, various embodiments of the exemplary system 100 may include a plurality of either or both such components.

The client device 115 is configured to receive, store, process, and transmit electronic data, as well as receiving input from a user and presenting output to a user (e.g., through a touch-screen display, microphone, camera, or speaker). The client device 115 includes a controller 150 that stores and processes electronic data and a communication unit 151 that communicates with external computing devices (e.g., TAS 165) via the digital communication link 108. In some embodiments, the client device 115 may further include input and output components, internal sensors, or other components to enhance the functionality of the client device 115 that are not shown.

The controller 150 receives, processes, produces, transmits, and stores data. The controller 150 includes a memory 152 storing processor-executable instructions in a non-transitory medium (including executable instructions of the NaaS SDK 110, the UI 116, and the third-party application 199), one or more processors 154 configured to execute computer-readable instructions, a random access memory (RAM) 156 for temporary memory, and an I/O circuit 158. The components of the controller 150 may be interconnected via an address/data bus or other means. It should be appreciated that although FIG. 1B depicts only one processor 154, the controller 150 may include multiple processors 154 in some embodiments. Similarly, the controller 150 may include multiple RAMs 156 and multiple memories 152. Although the I/O circuit 158 is depicted as a single block, the I/O circuit 158 may include a number of different I/O circuits, which may be configured for specific I/O operations. The processor 154 may include one or more processors of any type, including general-purpose processors or special-purpose processors. Similarly, the controller 150 may implement the RAM 156 and memory 152 as semiconductor memories, magnetically readable memories, optically readable memories, or any other type of memory.

The communication unit 151 manages communication between the controller 150 and external devices (e.g., the TAS 165) communicatively connected to the client device 115. The communication unit 151 may transmit and receive wired or wireless communications with external devices, using any suitable wireless communication protocol network, such as a wireless telephony network (e.g., GSM, CDMA, LTE, 5G, etc.), a Wi-Fi network (802.11 standards), a WiMAX network, etc. In addition, the controller 150 of the client device 115 may further be configured to communicate data through the communication unit 151 using any suitable data protocol, including encoding schemes for video communication over IP (e.g., H.264/MPEG-4 AVC or H.265/HEVC). Furthermore, the communication unit 151 may provide input signals to the controller 150 via the I/O circuit 158.

The TAS 165 likewise includes a controller 160 that stores and processes electronic data and a communication interface 161 that communicates with external computing devices (e.g., client devices 115) via the digital communication link 108. As with the client device 115, the controller 160 of the TAS 165 receives, processes, produces, transmits, and stores data. The controller 160 includes one or more of each of a memory 162, a processor 164, a RAM 166, and an I/O circuit 168, each configured and operating analogously to the corresponding components of the controller 150 described above. The memory 162 may store executable instructions to cause the TAS 165 to implement one or more of the functions of the various components of the proprietary communication network 140 (e.g., the API gateway 142, the EUI 144, the WSG 145, the WRG 147, the WCA 148, or the CSCF 149) discussed elsewhere herein. The TAS 165 also includes a communication interface 161 configured to send and receive electronic communication messages between the TAS 165 and external computing devices (e.g., client devices 115) via the digital communication link 108. In some embodiments, the digital communication link 108 may be part of a communication network, parts of which may be configured in accordance with a new radio (5G NR) protocol, and the communication interface 161 may interface with a core network of the communication network. The communication interface 161 may include software and hardware components configured to enable communication via the digital communication link 108 using standard or specialized communication protocols, such as those discussed above with respect to the communication unit 151.

Figure 2:
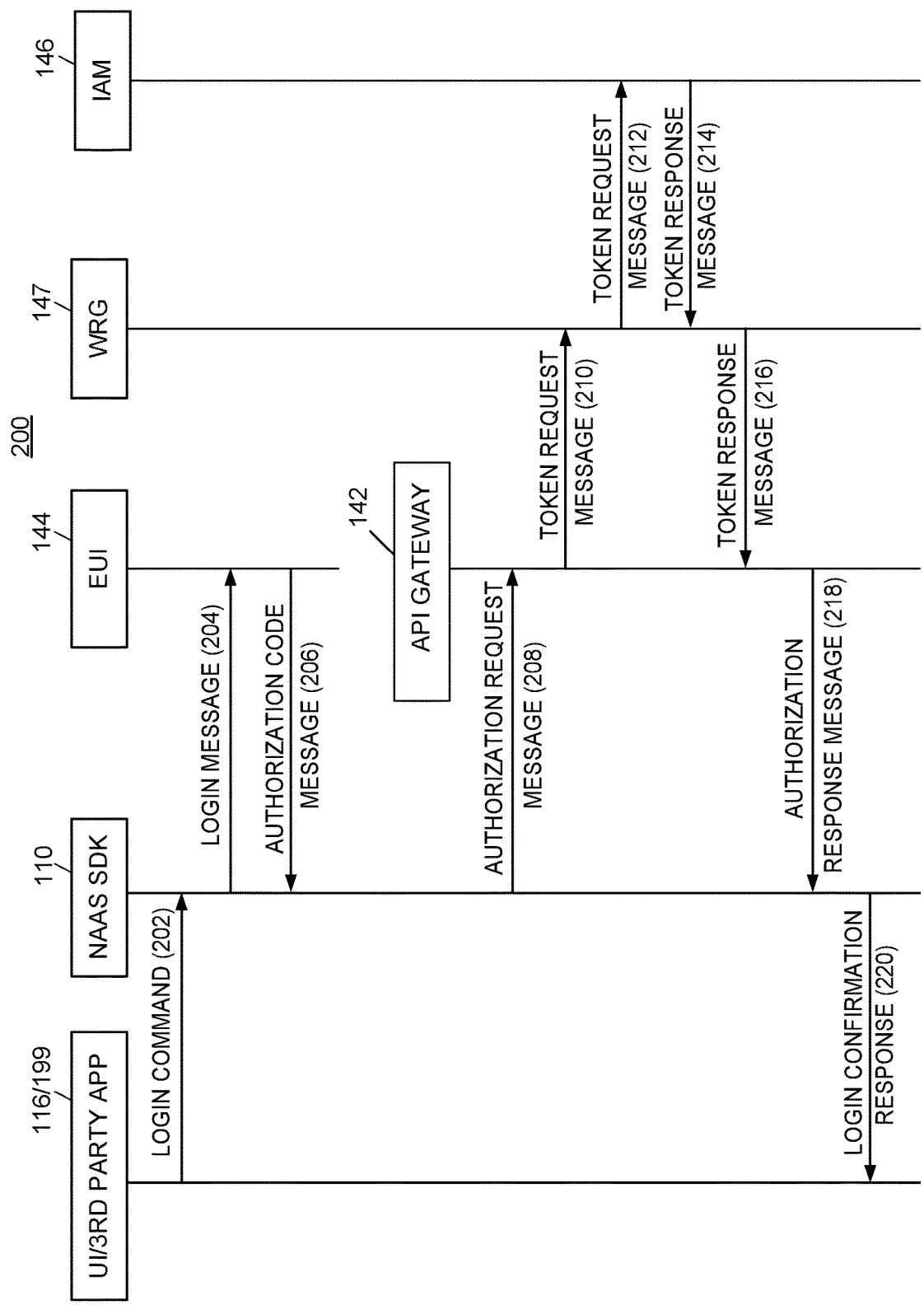
FIG. 2 illustrates a signal diagram of an exemplary authentication method for using the NaaS SDK to connect to the proprietary communication network.
Figure 3:
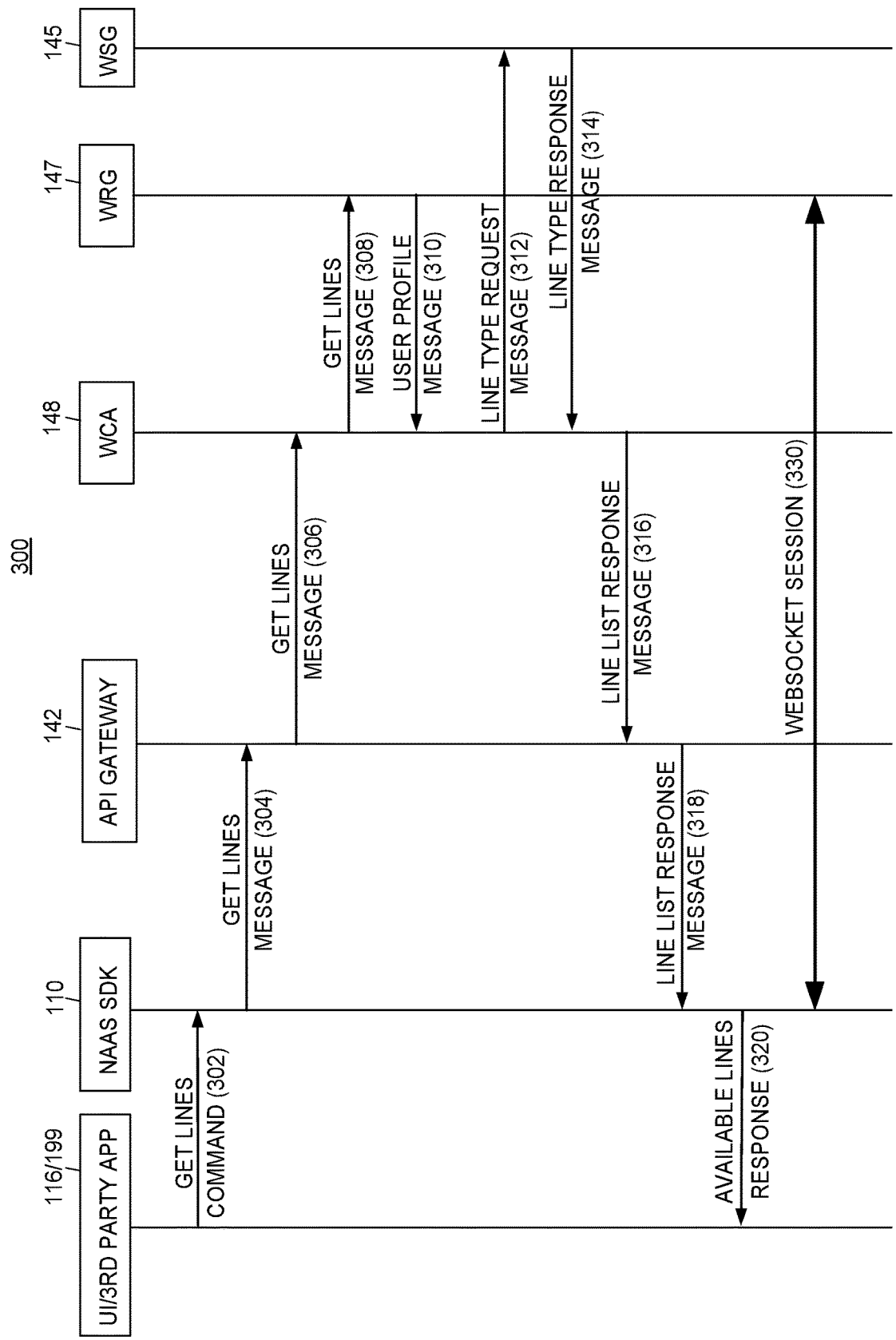
FIG. 3 illustrates a signal diagram of an exemplary line registration method for identifying and registering a service line associated with the user account.

FIGS. 2 and 3 illustrate exemplary processes of authenticating a user account and establishing a communication connection associated with a service line of the user account. FIG. 2 illustrates a signal diagram of an exemplary authentication method 200 for using the NaaS SDK 110 to connect to the proprietary communication network 140. FIG. 3 illustrates a signal diagram of an exemplary line registration method 300 for identifying and registering a service line associated with the user account. Once a service line is registered, the third-party application 199 is able to access functionalities of the proprietary communication network 140 through the NaaS SDK 110. In some embodiments in which only one service line is associated with a user account or in which a default service line has been set for the user account, line registration may occur as part of authentication of the user account. The operations of methods 200 and 300 may be implemented by the web authentication broker 122 of the NaaS SDK 110. By using the NaaS SDK 110 and the communications discussed below, third-party applications 199 are able to authenticate and register to obtain access to functionalities of the proprietary communication network 140 indirectly, without exposing the core of the proprietary communication network 140 to the third-party applications 199. This improves security and flexibility of network operation. In each of the figures, the NaaS SDK 110 is illustrated separately from the UI 116/third-party application 199 to emphasize handling of communication by the NaaS SDK 110, but both may be implemented by the client device 115.

The authentication method 200 begins with a login command 202 including a request to establish a communication connection. The login command 202 may be generated by the third-party application 199 or other application associated with the UI 116, such as in response to a user interaction with the UI 116. The processor 154 of the client device 115 may receive the login command 202 and send the login command 202 to the NaaS SDK 110, such as by calling an object or function of the NaaS SDK 110 based upon the login command 202. The login command 202 includes a client ID for identifying the client device 115 and a client secret for verifying the client device 115. Upon receiving the login command 202, the NaaS SDK 110 executes to log the user into a user account with user credentials associated with the user account. In some embodiments, this includes presenting a login page to a user (e.g., in a web browser of the client device 115). The NaaS SDK 110 may connect to an address of the EUI 144 (e.g., to a URL address) or provide such an address to the third-party application 199 or a web browser to present the login page. In other embodiments, the NaaS SDK 110 may store user credentials previously entered by the user. In any event, the NaaS SDK 110 causes the client device 115 to transmit a login message 204 to the EUI 144 to verify the user credentials. The login message 204 includes the user credentials (e.g., a user ID and password) for authentication by the EUI 144. The EUI 144 verifies the user credentials in the login message 204 and transmits an authorization code message 206 back to the client device 115, containing an authorization code. The authorization code is then used as a query parameter by the NaaS SDK 110 to obtain an access token for the proprietary communication network 140.

The NaaS SDK 110 generates and causes the client device 115 to transmit an authorization request message 208 to the API gateway 142 in order to obtain the access token that enables further use of the functionalities of the proprietary communication network 140. The authorization request message 208 includes the authorization code, as well as the client ID and client secret to identify the client device 115. Upon receiving the authorization request message 208, the API gateway 142 obtains the access token from the IAM 146 by sending a token request message 210 to the WRG 147, in response to which the WRG 147 sends a further token request message 212 to the IAM 146. Both of the messages 210 and 212 include the authorization code received from the EUI 144 in order to authenticate the user account on the client device 115. Upon receiving the further token request message 212, the IAM 146 evaluates the authorization code and (when verified) authenticates the user account. The IAM 146 next generates an access token for the authenticated user account and transmits the access token in a token response message 214 to the WRG 147. The WRG 147 receives the access token and transmits it to the API gateway 142 in a further token response message 216, which also includes the client ID and a session ID for a communication session associated with the access token. In response to such message, the API gateway 142 maps the access token to the session ID and the client ID for handling further communication with the client device 115. The API gateway 142 then transmits the access token to the client device 115 in an authorization response message 218, which is received and persisted in local memory of the client device 115 by the NaaS SDK 110 within the client device 115 for further communication with the proprietary communication network 140. The NaaS SDK 110 may then return a login confirmation response to the UI 116 or third-party application 199, such as a Boolean value indicating success or failure of authentication.

The line registration method 300 may follow authentication of the user account in order to register a service line with the client device 115 through the NaaS SDK 110. In order to register one or more service lines, the line registration method 300 first gets a list of available lines associated with the user account. The line registration method 300 begins with a get lines command 302 from the third-party application 199 or other application associated with the UI 116, such as in response to a user interaction with the UI 116. The processor 154 of the client device 115 may receive the get lines command 302 and send the get lines command 302 to the NaaS SDK 110, such as by calling an object or function of the NaaS SDK 110 based upon the get lines command 302. Upon receiving the get lines command 302, the NaaS SDK 110 executes to cause the client device 115 to transmit a get lines message 304 to the API gateway 142. The get lines message 304 includes the access token persisted by the NaaS SDK 110. Upon receiving the get lines message 304, the API gateway 142 transmits a corresponding get lines message 306 to the WCA 148 to obtain a list of available lines associated with the user account.

The WCA 148 transmits a further get lines message 308 to the WRG 147 to obtain information regarding available lines in a user profile associated with the user account. In response to receiving the further get lines message 308, the WRG 147 returns a user profile associated with the user account in a user profile message 310. In addition to identifying information regarding the user account, the user profile includes a list of associated lines, including a line ID for each line. Using the line IDs in the user profile, the WCA 148 further determines available lines by communication with the WSG 145. The WCA 148 transmits a line type request message 312 including the line IDs to the WSG 145. In response, the WSG 145 replies to the WCA 148 with a line type response message 314 including a line type for each line. The line types indicate active or inactive status of each line and may, in some embodiments, further indicate permitted functionalities or limitations associated with each line (e.g., international calling or text messaging). The WCA 148 then filters the lines based upon the line types to obtain a list of available lines (i.e., lines that meet filter criteria) and transmit a line list message to the API gateway 142, which API gateway 142 passes the received list of available lines to the NaaS SDK 110 of the client device 115 in a line list response message 318. The NaaS SDK 110 may then return an available lines response 320 including an indication of one or more of the available lines to the UI 116 or the third-party application 199.

The user (via the UI 116) or the third-party application 199 may then select for registration with the proprietary communication network 140 one or more lines from the available lines returned by the NaaS SDK 110. In some embodiments, the NaaS SDK 110 may select a line from the available lines for registration and return only the selected line. In further embodiments, the NaaS SDK 110 may cause the list of available lines to be stored for further use. Once a line is selected, the NaaS SDK 110 causes the line to be registered by performing necessary network configuration steps to register the line for use by the client device 115. Thus, when the NaaS SDK 110 is called to register a line, the NaaS SDK 110 causes the client device 115 to communicate through the API gateway 142 to establish a channel with the WRG 147. In some embodiments, such registration includes the following actions: validating E911 setup, creating the channel (which may include obtaining a channel URL), checking capabilities of the line, subscribing to network features (e.g., VOIP, chat, and media), registering the line, subscribing to a network management system (NMS), and subscribing to unstructured supplementary service data (USSD).

When the line has been registered with the proprietary communication network 140, the WebSocket handler 124 of the NaaS SDK 110 establishes a WebSocket session 330 between the client device 115 and the WRG 147 for further inbound and outbound communication. The poller 128 of the NaaS SDK 110 then keeps the WebSocket session 330 open by polling the WRG 147 at regular intervals. This ensures the third-party application 199 can send and receive communication data via the registered line through the proprietary communication network 140 using additional operations of the NaaS SDK 110, as described below.

FIGS. 4A-C and 5 illustrate communication between the client device 115 and the proprietary communication network 140 to implement voice call and text messaging functionalities using the communication connection of a registered line, following authentication and registration by procedures such as the authentication method 200 and line registration method 300 described above. Other functionalities of the proprietary communication network 140 may be supported by the communication connection of the registered line or lines. Further communication via the proprietary communication network 140 to another conversing party is not shown, as it will be understood that such further communication proceeds according to existing communication protocols of the proprietary communication network 140 (and, in some instances, with other connected proprietary communication systems maintained by other network operators) to communication equipment of the other conversing party. As above, the NaaS SDK 110 is illustrated separately from the UI 116/third-party application 199 to emphasize handling of communication by the NaaS SDK 110, but both may be implemented by the client device 115. Additionally, the API gateway 142 serves as a pass-through component for messages between the NaaS SDK 110 of the client device 115 and the WRG 147, so separate messages between the NaaS SDK 110 and API gateway 142 and between the API gateway 142 and WRG 147 are not separately illustrated.

Figure 4A:
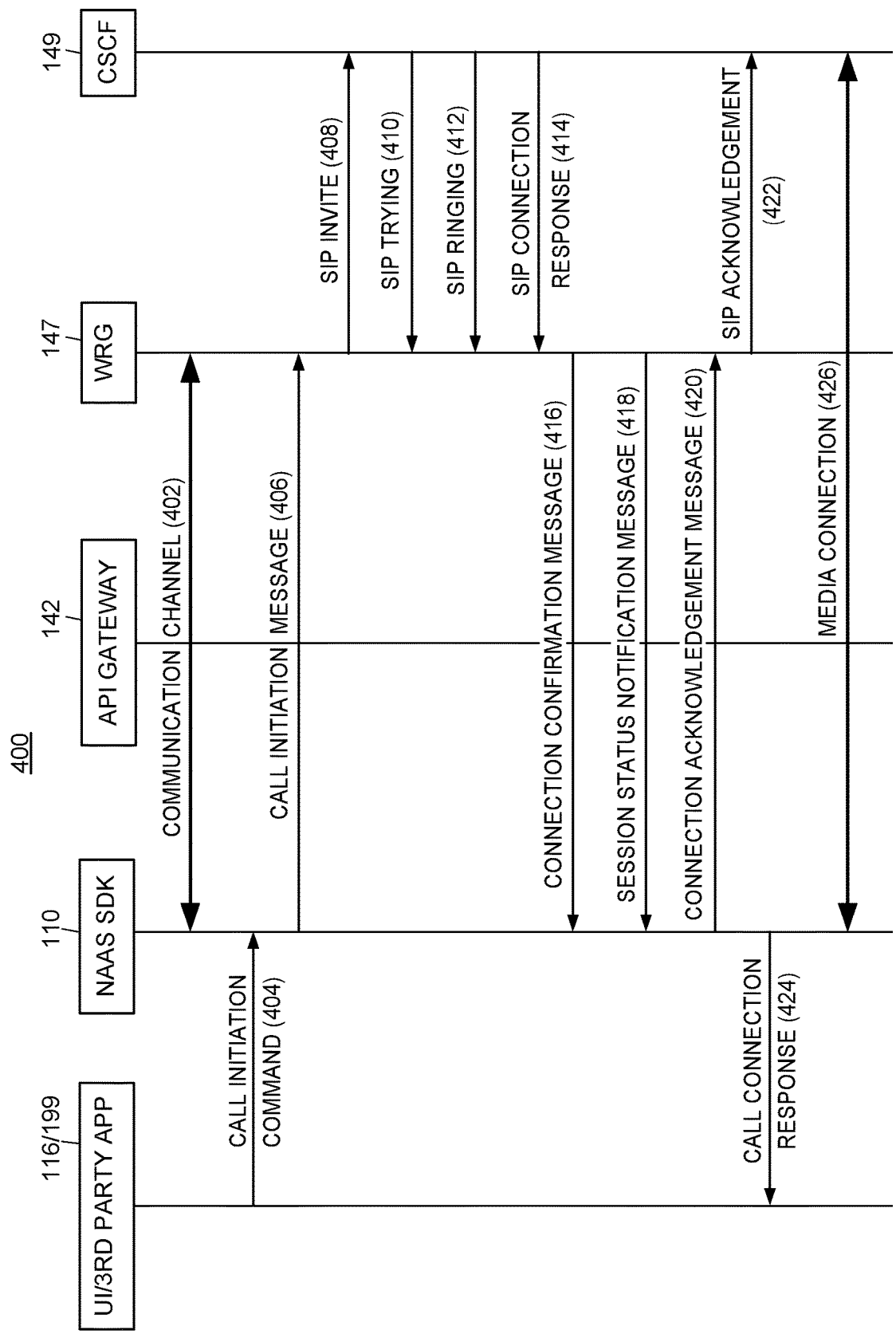
FIG. 4A illustrates a signal diagram of an exemplary outbound call initiation method for making a call from the third-party application via an established communication channel.

FIG. 4A illustrates a signal diagram of an exemplary outbound call initiation method 400 for making a call from the third-party application 199 or other application associated with the UI 116 via an established communication channel 402, such as the WebSocket session 330 described above. In response to a call initiation command 404 generated by the third-party application 199 or other application associated with the UI 116, the NaaS SDK 110 generates and sends a call initiation message 406 from the client device 115 to the WRG 147 to establish a VOIP call session. The processor 154 of the client device 115 may receive the call initiation command 404 and call an object or function of the NaaS SDK 110 to handle initiating the call. The call initiation command 404 includes an indication of a recipient of the call (e.g., a telephone number of the recipient). In some embodiments, the call initiation command 404 may further include an indication of the originating line. Alternatively, the NaaS SDK 110 may determine the originating line based upon the established communication channel 402. In further embodiments, the NaaS SDK 110 may retrieve or determine additional information regarding the call for inclusion in the call initiation message 406, such as session description protocol (SDP) parameters for the call. To determine such additional information, the NaaS SDK 110 may obtain a local description of device capabilities or other parameters for the session.

Upon receiving the call initiation message 406, the WRG initiates the call by communication with the CSCF 149, such as by session initiation protocol (SIP) messages. Thus, the WRG transmits a SIP invite message 408 to the CSCF 149, which responds with a SIP trying message 410 indicating the CSCF 149 is attempting to locate and connect to the recipient device, followed by a SIP ringing message 412 indicating the call is ringing through to the recipient device, and finally a SIP connection response message 414 indicating the recipient device (or its proxy) has connected. When the WRG 147 receives the SIP connection response message 414 (e.g., a SIP 200 OK response), it sends a connection confirmation message 416 to the NaaS SDK 110 (e.g., an HTTP 201 Created response). Additionally, the WRG 147 may send a session status notification message 418 to the NaaS SDK 110 via the WebSocket connection of the established communication channel 402 in order to provide information regarding the session (e.g., SDP parameters in a JSON object). Thus, the NaaS SDK 110 obtains the parameters of the call from the WRG 147 for further use in handling session communication. In response to these messages, the NaaS SDK 110 sends a connection acknowledgement message 420 to the WRG 147, which causes the WRG 147 to send a SIP acknowledgment message 422 to the CSCF 149.

After sending the connection acknowledgment message 420, the NaaS SDK 110 further returns a call connection response 424 to the third-party application 199 or other application associated with the UI 116 indicating the call is connected. An indication of successful connection may be presented to the user of the client device 115, such as via the UI 116. The call may then proceed over the media connection 426 as a VOIP call using real-time transport protocol (RTP) or secure real-time transport protocol (SRTP). The media connection 426 may persist until terminated at the end of the call, as discussed further below.

Figure 4B:
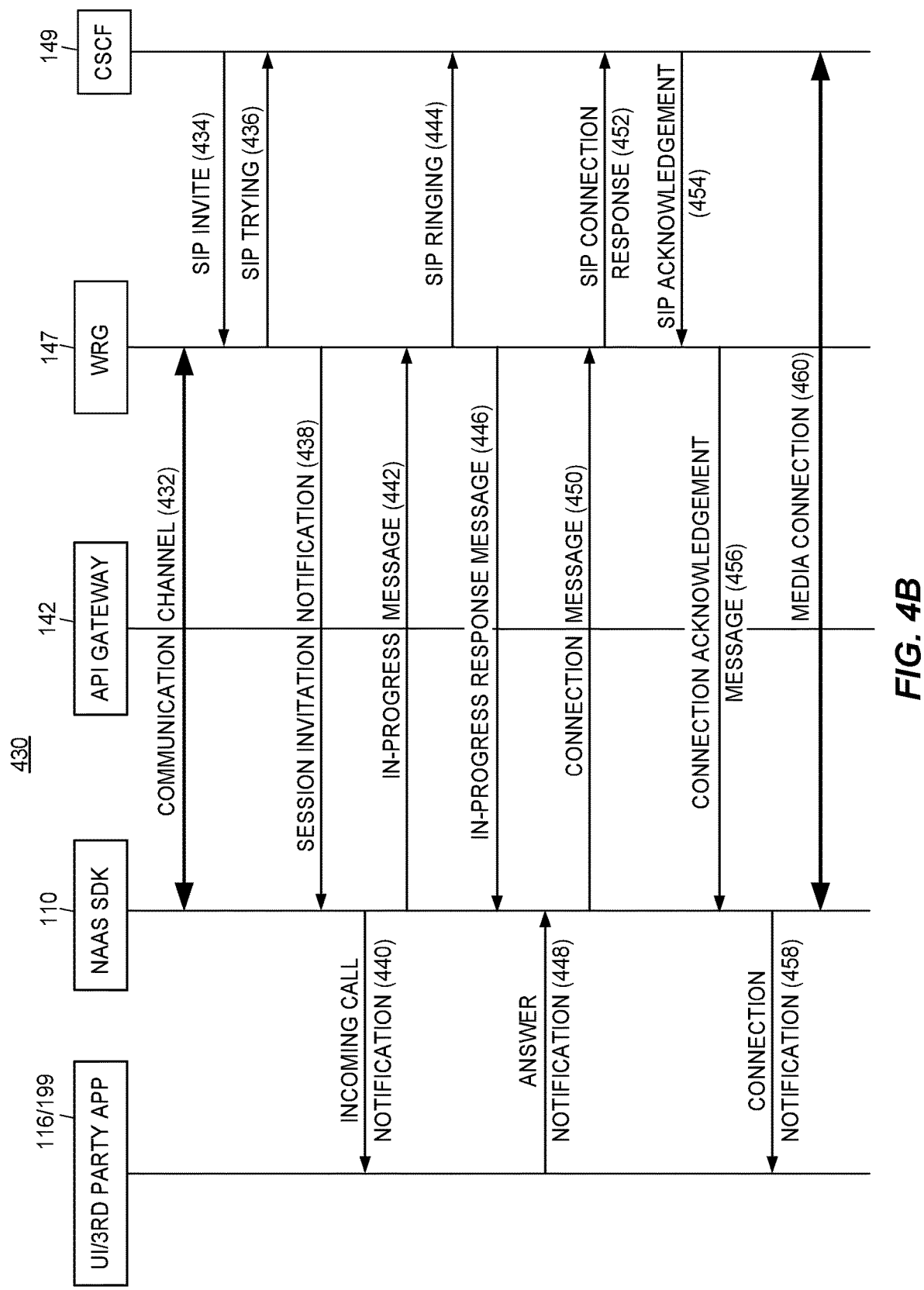
FIG. 4B illustrates a signal diagram of an exemplary inbound call receiving method for receiving a call from another user via an established communication channel.

FIG. 4B illustrates a signal diagram of an exemplary inbound call receiving method 430 for receiving a call from another user via an established communication channel 432, such as the WebSocket session 330 described above. A SIP invite message 434 is transmitted from the CSCF 149 to the WRG 147 to initiate the call at the request of the other user, and the WRG 147 responds to the CSCF 149 with a SIP trying message 436 to indicate an attempt to reach the recipient of the call. The SIP invite message 434 may include an indication of the recipient (e.g., a telephone number of the recipient) and additional information regarding the call (e.g., SDP parameters). The WRG 147 then identifies the established communication channel 432 based upon the previous registration of the associated line and transmits a session invitation notification 438 to the NaaS SDK 110 at the client device 115 via the WebSocket connection of the established communication channel 432 in order to provide information regarding the session (e.g., SDP parameters in a JSON object). The session invitation notification 438 may include information regarding the session, such as SDP parameters for the session. Upon receiving the session invitation notification 438, the NaaS SDK 110 provides an incoming call notification 440 to the third-party application 199 or other application associated with the UI 116 at the client device 115. The NaaS SDK 110 also responds to the WRG 147 with an in-progress message 442 indicating the user is being notified of the incoming call. The WRG 147 then provides a SIP ringing message 444 to the CSCF 149 to indicate to the calling device that the call is ringing at the client device 115. The WRG 147 also responds with an in-progress response message 446 to the NaaS SDK 110 to confirm receipt of the in-progress message 442.

When the user answers the call, the third-party application 199 or other application associated with the UI 116 provides an answer notification 448 to the NaaS SDK 110 at the client device 115. In response to such answer notification 448, the NaaS SDK 110 transmits a connection message 450 to the WRG 147 to accept the call and establish the session. The connection message 450 may include information regarding the call, such as SDP parameters for the call. Upon receiving the connection message 450, the WRG 147 sends a SIP connection response message 452 (e.g., a SIP 200 OK response) to the CSCF 149 to indicate the client device 115 has answered and connected to the call. The CSCF 149 then provides a SIP acknowledgement message 454 to the WRG 147 to confirm the connection. In response, the WRG 147 sends a connection acknowledgment message 456 to the NaaS SDK 110, which then provides a connection notification 458 to the third-party application 199 or other application associated with the UI 116. An indication of successful connection may be presented to the user of the client device 115, such as via the UI 116. The call may then proceed over the media connection 460 as a VOIP call using real-time transport protocol (RTP) or secure real-time transport protocol (SRTP). The media connection 460 may persist until terminated at the end of the call, as discussed further below.

Figure 4C:
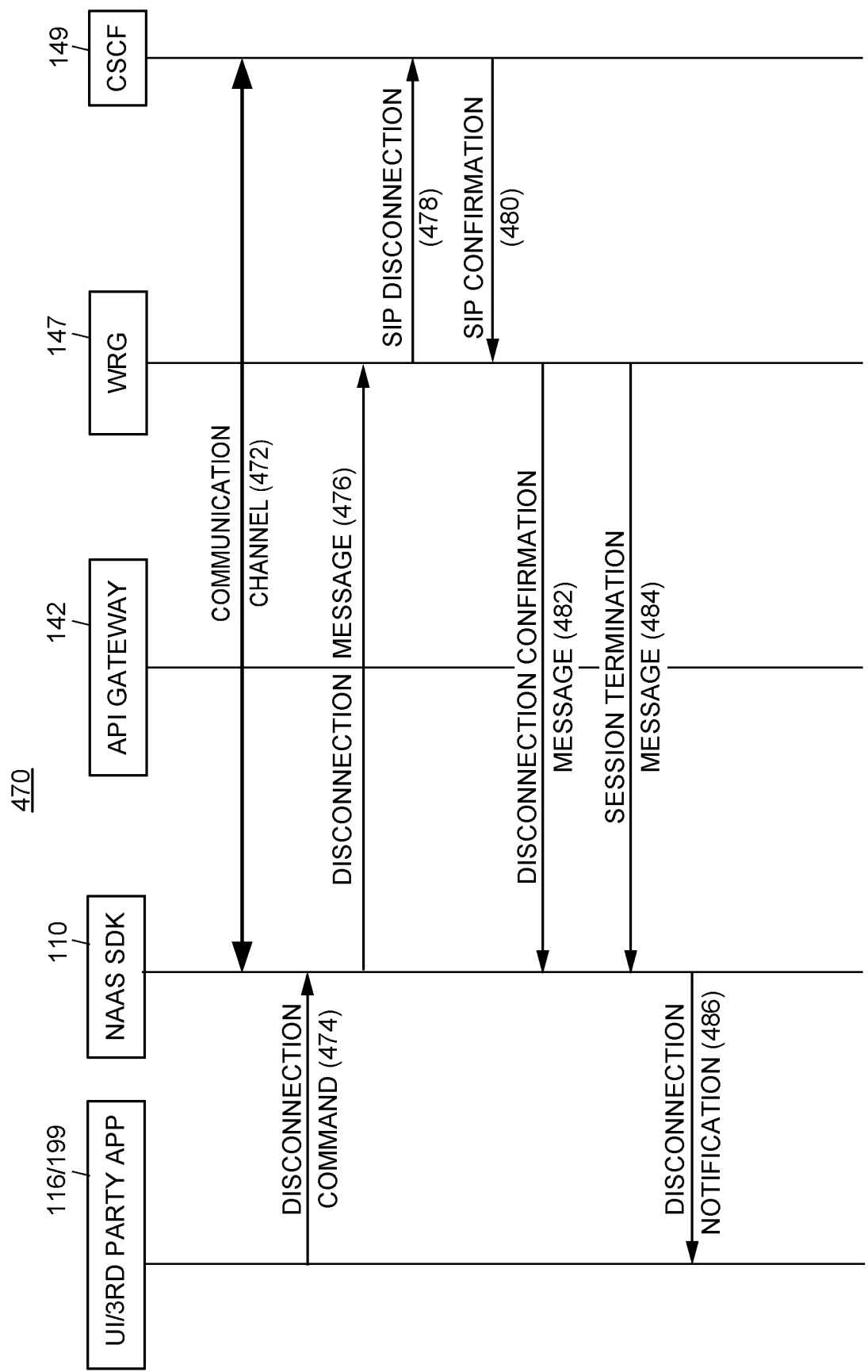
FIG. 4C illustrates a signal diagram of an exemplary call disconnection method for terminating a call over an established communication channel.

FIG. 4C illustrates a signal diagram of an exemplary call disconnection method 470 for terminating a call over an established communication channel 472, such as the media connections 426 or 460 described above. During the course of an ongoing call, the user of the client device 115 may disconnect by indicating the disconnection through interaction with the third-party application 199 or other application associated with the UI 116. Upon such occurrence, the third-party application 199 or other application associated with the UI 116 provides a disconnection command 474 to the NaaS SDK 110. In response to receiving such disconnection command 474, the NaaS SDK 110 sends a disconnection message 476 to the WRG 147. The WRG 147 then sends a SIP disconnection message 478 (e.g., a SIP BYE message) to the CSCF 149 to notify the other conversing party of termination of the call, and the CSCF 149 returns a SIP confirmation message 480 (e.g., a SIP 200 OK response) to confirm call termination. The WRG 147 similarly provides a disconnection confirmation message 482 to the NaaS SDK 110. The WRG 147 also sends a session termination message 484 via the WebSocket connection of the established communication channel 472 in order to terminate the session (e.g., a termination notification in a JSON object). When the session is thus terminated, the NaaS SDK 110 provides a disconnection notification 486 to the third-party application 199 or other application associated with the UI 116. In some embodiments, an indication of the disconnection may then be presented to the user via the UI 116.

Figure 5:
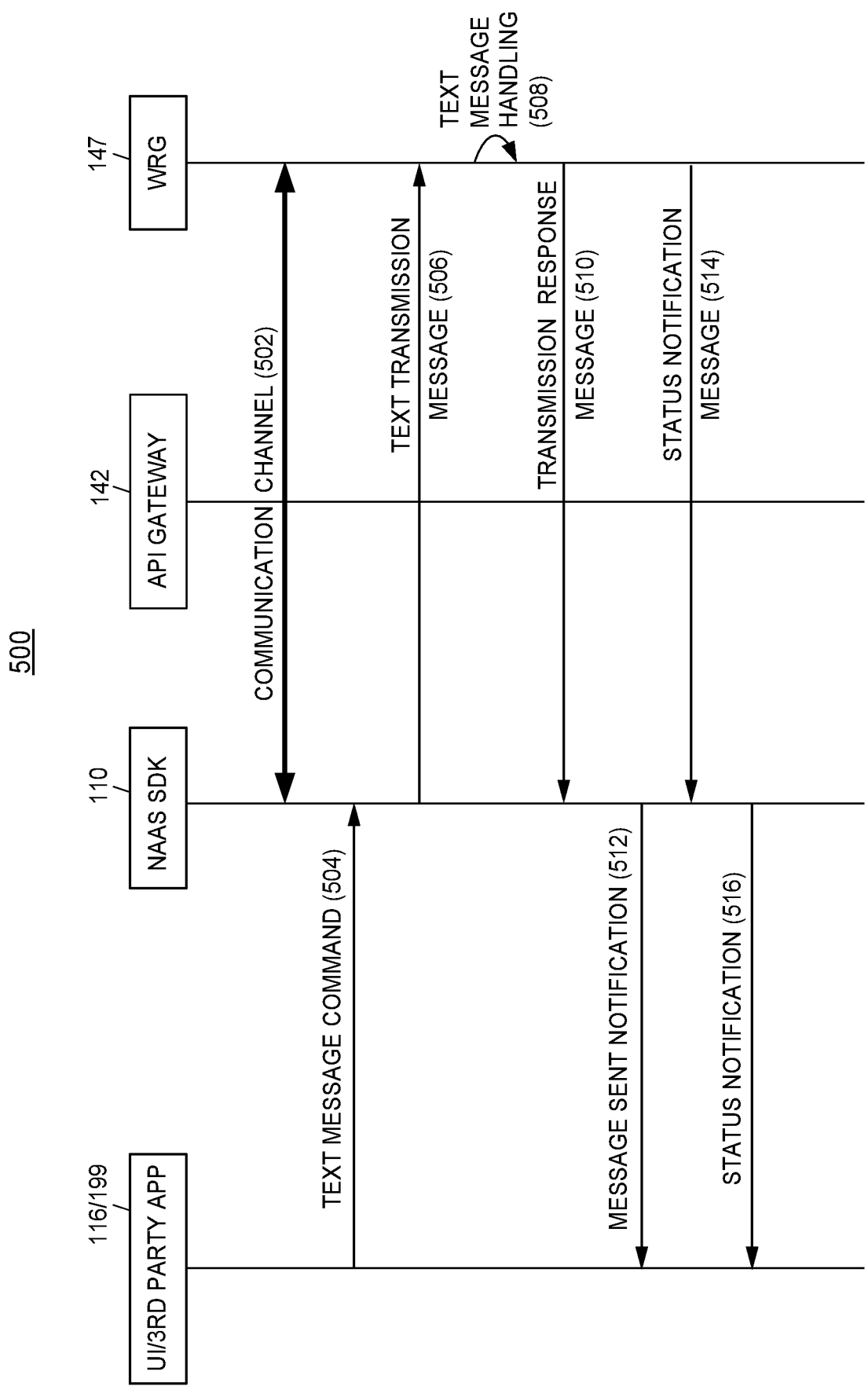
FIG. 5 illustrates a signal diagram of an exemplary text messaging method for sending a text message from the client device via the NaaS SDK connected to the proprietary communication network via an established communication channel.

FIG. 5 illustrates a signal diagram of an exemplary text messaging method 500 for sending a text message from the client device 115 via the NaaS SDK 110 connected to the proprietary communication network 140 via an established communication channel 502, such as the WebSocket session 330 described above. The third-party application 199 or other application associated with the UI 116 provides a text message command 504 to the NaaS SDK 110, which includes at least indications of the text message content and recipient of the text message. In some embodiments, the text message command 504 include the text message, a recipient identifier (e.g., a recipient phone number), and a sender identifier (e.g., a phone number associated with the registered line). Although described herein as a text message, the content of such text message may include media other than text, including digital photographs, videos, sound files, or other computer-readable files.

Upon receiving the text message command 504, the NaaS SDK 110 generates and sends a text transmission message 506 to the WRG 147 containing the text message content, a recipient identifier, and a sender identifier. In some embodiments, the text transmission message 506 may include additional information regarding handling of the text messaging, such as whether to provide a delivery receipt or read receipt to the sender. Upon receiving the text transmission message 506, the WRG 147 proceeds to handle transmission of the content as a text message (line 508) according to existing protocols for text messaging functionality within the proprietary communication network 140 (e.g., short message service (SMS) or rich communication service (RCS) messaging protocols) to send the text message to the identified recipient. The WRG 147 may thus communicate with an SMS center (SMSC) or an RCS messaging server (RMS) to complete the text message delivery. The WRG 147 further provides a transmission response message 510 to the NaaS SDK 110 to indicate the text message has been sent. The NaaS SDK 110 may then provide a message sent notification 512 to the third-party application 199 or other application associated with the UI 116 to indicate the success or failure of sending the text message. In some embodiments, when the text message is delivered or read, the WRG 147 may send a delivery receipt or read receipt in a status notification message 514 to the NaaS SDK 110 via the WebSocket connection of the established communication channel 502. In response to such notification, the NaaS SDK 110 may then provide a status notification 516 to the third-party application 199 or other application associated with the UI 116 to indicate the text message has been delivered to the recipient or read by the recipient, as appropriate. In some embodiments, separate delivery and read receipt notification may be provided.

Figure 6:
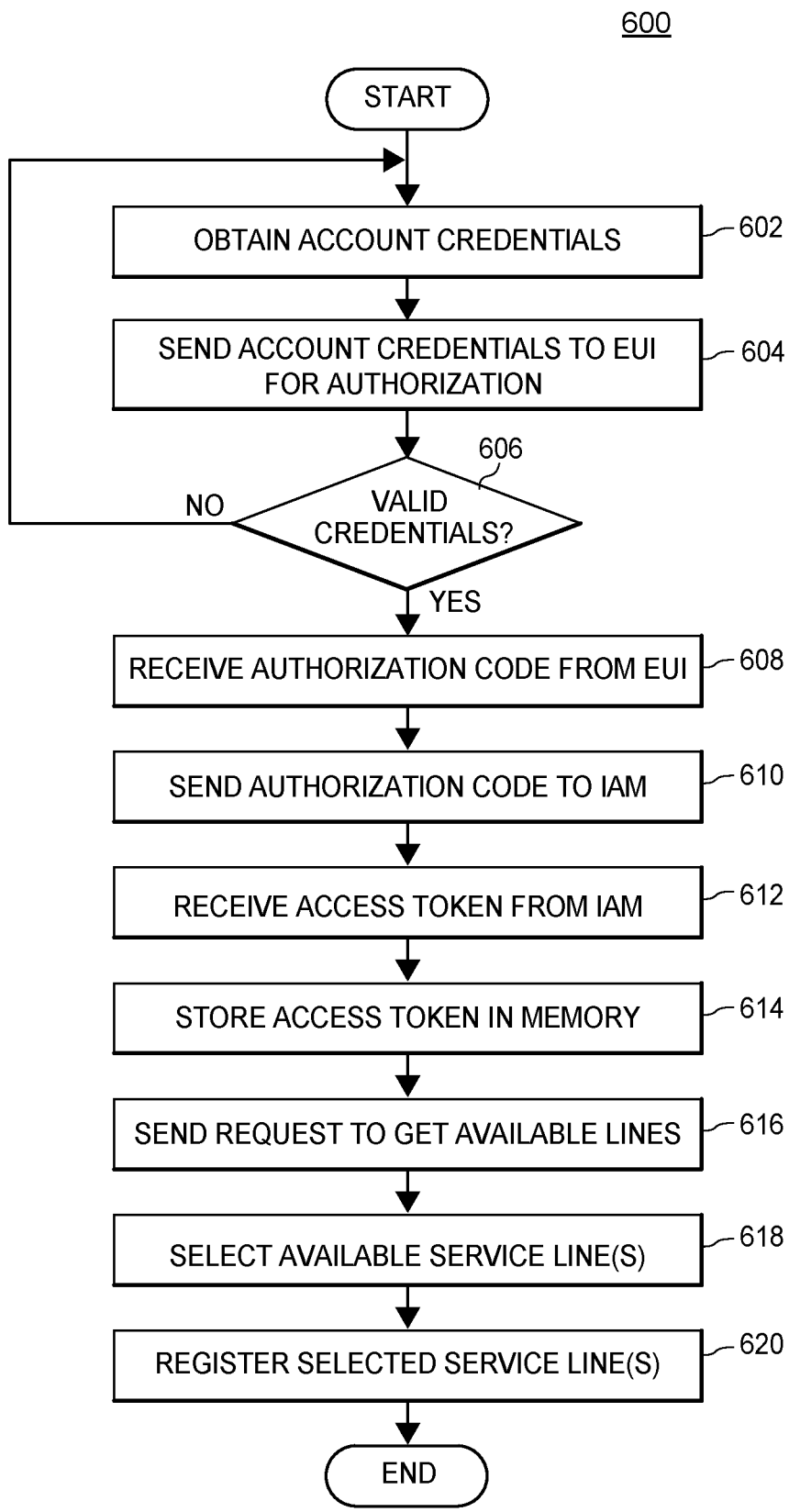
FIG. 6 illustrates a flow diagram of an exemplary authentication and registration method for obtaining access to functionalities of the proprietary communication network using the NaaS SDK.

FIG. 6 illustrates a flow diagram of an exemplary authentication and registration method 600 for obtaining access to functionalities of the proprietary communication network 140 using the NaaS SDK 110. Aspects of the authentication and registration method 600 may be implemented by components of the system 100, as described above. This may include communication between components via a digital communication link 108 or I/O circuit 158.

The authentication and registration method 600 begins with obtaining account credentials from a user (block 602). The account credentials may include a user name or account ID and a password. A login page may be presented to the user as a web page in a web browser or as an application page via the UI 116 of the client device 115 by the NaaS SDK 110. The user of the client device 115 may then enter the account credentials associated with the user account. After initial entry, in some embodiments, the account credentials may be securely stored in the memory 152 of the client device 115 for future use, and such stored account credentials may later be obtained from the memory 152. The account credentials obtained from the user may be sent to the EUI 144 for verification and authorization of the user (block 604). This may include transmitting account credentials entered by the user in a login page associated with the EUI 144 via a digital communication link 108 for evaluation by the EUI 144. In some embodiments, a login web page may be associated with an authorization URL that is passed to and/or displayed by a native web browser using the web authentication broker 122 of the NaaS SDK 110, such that the native web browser is used to handle communication with the EUI 144 and display of the login page.

Upon receiving the account credentials from the client device 115, the EUI 144 attempt to validate the credentials using known credentials of valid accounts to determine whether the account credentials are valid (block 606). In some embodiments, the EUI 144 may further validate the account status to ensure the account is active or to identify limitations or restrictions on functionality use associated with the account. When the account credentials are determined to be invalid, the EUI 144 may return a message to cause the client device 115 to prompt the user to reenter the account credentials, with the authentication and registration method 600 proceeding again with obtaining account credentials at block 602. When the account credentials are determined to be valid, the EUI 144 may return a message including an authorization code to the client device 115 (block 608), which is received and used by the web authentication broker 122 of the NaaS SDK 110 to further obtain access to the functionalities of the proprietary communication network 140.

Upon receiving the authorization code from the EUI 144, the NaaS SDK 110 further sends the authorization code to the IAM 146 in order to authenticate the account at the client device 115 (block 610). The authorization code may be transmitted from the client device 115 in a message that further includes additional identifying information, such as a client ID and client secret to identify the client device 115. As discussed above, the message may be sent indirectly through the API gateway 142 and the WRG 147 to the IAM 146. When the IAM 146 receives the authorization code, the IAM 146 may generate and send an access token to the NaaS SDK 110 for use in accessing functionalities of the proprietary communication network 140 (block 612). In some embodiments, the IAM 146 may transmit the access token to the client device 115 indirectly through the WRG 147 and the API gateway 142. In such embodiments, the API gateway 142 may map the received access token with other data, such as a session ID and/or client ID. Such mapped data may thereafter be used to match communication from the NaaS SDK 110 of the client device 115 with the access token. The NaaS SDK 110 receives and stores the access token and any additional information (such as the session ID and/or client ID) at the client device 115 for further use in accessing the proprietary communication network 140 (block 614). The access token may thereafter be used to authenticate one or more subsequent requests to access functionalities of the proprietary communication network 140, such as VOIP or text messaging services provided by the proprietary communication network 140.

Next, the NaaS SDK 110 causes the client device 115 to request a list of available service lines associated with the authenticated account (block 616). The NaaS SDK 110 may request such list of available lines in response to a command from a third-party application 199 or other application associated with the UI 116. As discussed above, requesting available service lines may include sending a message (including the access token) to the API gateway 142 for further communication with the WCA 148 to obtain a user profile (including lines associated with a user account) from the WRG 147, which is then used to get line details (e.g., line type) from the WSG 145. Using the line details, the WCA 148 returns the list of available lines to the NaaS SDK 110 via the API gateway 142. In some embodiments, the NaaS SDK 110 may present the available lines to the user of the client device 115 for selection via the third-party application 199 or other application associated with the UI 116. One or more of the available service lines is then selected for registration (block 618). In some embodiments, such selection may be received from the user via the UI 116. In further embodiments, the NaaS SDK 110 may select one or more of the lines to register, such as by selecting the sole line associated with an account or selecting a default line for the account.

When the one or more lines are selected, the NaaS SDK 110 registers each selected line with the proprietary communication network 140 (block 620). Registering a selected line may include sending a request to register the line to the WRG 147 via the API gateway 142. In some embodiments in which multiple lines have been selected for registration, the NaaS SDK 110 may sequentially submit a request to register one line at a time. Alternatively, the NaaS SDK 110 may simultaneously submit multiple requests to register multiple lines at the same time. The NaaS SDK 110 may submit one or more requests for each line in order to perform the following registration steps: emergency 911 validation; create a channel; check capabilities; subscribe to VOIP, chat, file transfer, or any other functional service; registration of the line with the network; NMS subscription; and/or USSD subscription. In some embodiments, creating a channel may include the NaaS SDK 110 establishing a WebSocket session with a WRG endpoint associated with the WRG 147, such as a received channel URL, to facilitate communication via the channel. In some embodiments, after the NaaS SDK 110 has successfully completed one or more the aforementioned requests, a WebSocket connection may be kept active/alive by the poller 128 polling the WRG 147 at regular intervals.

Figure 7:
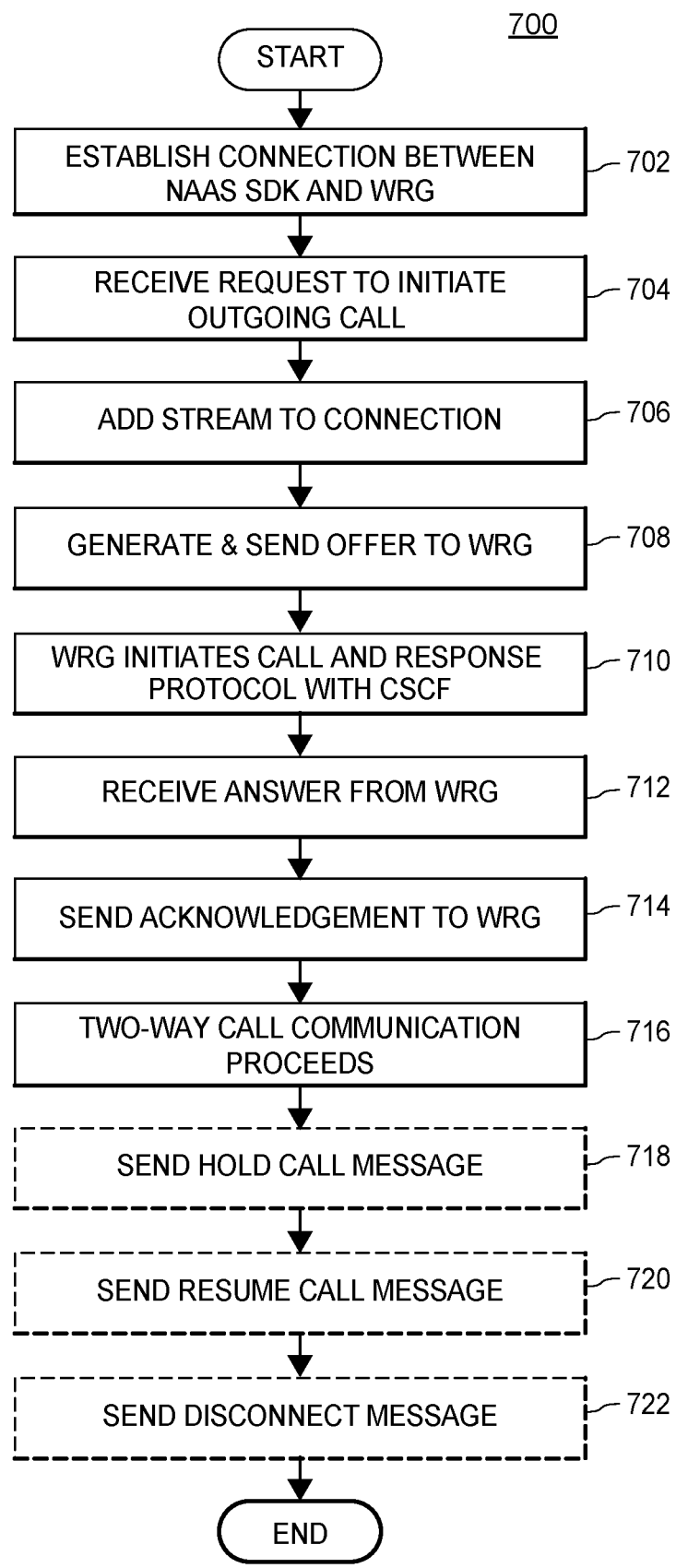
FIG. 7 illustrates a flow diagram of an exemplary outbound calling method for connecting, maintaining, and disconnecting a telephonic call by a third-party application of the client device via the NaaS SDK.

After each of the desired active lines has been registered, the one or more third-party applications 199 may access the functionalities of the proprietary communication network 140. FIG. 7 illustrates an exemplary method of using core network functionalities of the proprietary communication network 140 through the third-party application 199 to make an outbound call following authentication and registration of the client device 115 via the NaaS SDK 110.

FIG. 7 illustrates a flow diagram of an exemplary outbound calling method 700 for connecting, maintaining, and disconnecting a telephonic call by a third-party application 199 of the client device 115 via the NaaS SDK 110. The outbound calling method 700 may be implemented as described above with respect to the exemplary outbound call initiation method 400 after the authentication and registration method 600 has been performed to access the proprietary communication network 140. Aspects of the outbound call method 700 may be implemented by components of the system 100, particularly the NaaS SDK 110 implemented by the client device 115, as described above. This may include communication between components via a digital communication link 108 or I/O circuit 158. Although the method 700 is described as communicating with a third-party application 199, some or all of such communication may be with or through another application associated with the UI 116.

The outbound calling method 700 begins with establishing a connection between the NaaS SDK 110 and the WRG 147 (block 702), such as a communication channel established by the authentication and registration method 600 discussed above. In some embodiments, the NaaS SDK 110 establishes the connection by establishing a notification channel and WebSocket connection using the access token. Following establishment of such connection, the NaaS SDK 110 receives a request to initiate an outgoing call (block 704). The request may be generated by the third-party application 199, such as a request to establish a VOIP call with a specified receiving user associated with a receiving telephone number. In some embodiments, the request may specify the user account or active line from which to place the call, while in other embodiments a default line may be stored or selected by the NaaS SDK 110. In response to receiving the request to initiate the call, the NaaS SDK 110 attempts to initiate the call through the proprietary communication network 140 by communication with the WRG 147.

Initiating the call may include adding a stream or channel to the connection (block 706), then generating and sending an offer to establish the call to the WRG 147 (block 708). To add a stream to the connection, the NaaS SDK 110 may obtain necessary data from the client device 115, which may include accessing data previously stored by the NaaS SDK 110. For example, the NaaS SDK 110 may determine a type of stream to add based upon a type of user media to be communicated via the stream (e.g., audio or video), which may be determined by default rules or may be indicated by the third-party application 199. Similarly, generating the offer to establish the call may include determining SDP parameters for the call, which may include parameters received from the third-party application 199 (e.g., recipient phone number) and parameters determined or stored by the NaaS SDK 110 (e.g., originator phone number). Once the offer is generated, the NaaS SDK 110 sends the offer to establish the call in a message to the WRG 147 (e.g., by causing the client device 115 to send the message via the digital communication link 108). In some embodiments, the NaaS SDK 110 may set a local description for the session.

In response to receiving the offer to establish the call, the WRG 147 initiates a call and response protocol with the CSCF 149 to initiate the call (block 710). Such call and response protocol may include sending a SIP invite to and receiving SIP responses from the CSCF 149, as discussed above. When the call is connected, the WRG 147 returns an answer message to the NaaS SDK 110 indicating the connection (block 712). The answer message includes a session ID for the session (i.e., a unique identifier for the call). The answer message may further include SDP parameters returned from the receiving user equipment to establish the parameters of the call. In some embodiments, the NaaS SDK 110 may set a remote description for the session. Upon receiving the returned SDP parameters, the NaaS SDK 110 may send an acknowledgement message to the WRG 147 to confirm connection to the call (block 714), following which two-way call communication occurs between the users for the duration of the session (block 716).

In some embodiments, additional functionalities of the proprietary communication network 140 may be accessed while the call is ongoing. To use such additional network functionalities, the third-party application 199 issues commands to the NaaS SDK 110, which then communicates with the WRG 147. For example, the user may decide to place the call on hold, then later resume the call. To place the call on hold, in response to receiving a command from the third-party application 199, the NaaS SDK 110 sends a hold call message to the WRG 147 (block 718). To later resume the call, in response to a further command from the third-party application 199, the NaaS SDK 110 sends a resume call message to the WRG 147 (block 720). Such messages may include the session ID for the call in order to identify the call to which the operations should be applied. In further embodiments, the user may hang up and disconnect the call. This may include the third-party application 199 issuing a disconnect command to the NaaS SDK 110, in response to which the NaaS SDK 110 may send a disconnect message to the WRG 147 (block 722). Such message may include the session ID for the call in order to identify the call to terminate. After receiving this message, the WRG 147 may transmit a termination signal to the CSCF 149 (e.g., a SIP BYE message) in order to terminate dialogue and end the call. Upon disconnection by either user, the call ends, and the session terminates.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for automatically initiating the transmission of a silent emergency message via a mobile computing device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed:

1. A method for providing access to a proprietary communication network, comprising:
   receiving, at a processor of a client device, a request to establish a communication connection with the proprietary communication network from a third-party application running on the client device;
   accessing, by the processor, a network as a service software development kit (NaaS SDK), wherein the NaaS SDK includes a web authentication broker and a WebSocket handler;
   obtaining, by the web authentication broker of the NaaS SDK executed by the processor, an access token associated with a user account by transmitting an authentication request to a network gateway and receiving the access token from the network gateway;
   registering, by the web authentication broker of the NaaS SDK executed by the processor, a service line associated with the user account by transmitting a service line selection request to the network gateway; and
   establishing, by the WebSocket handler of the NaaS SDK executed by the processor, a communication channel associated with the service line between the client device and the network gateway, wherein the communication channel provides real-time access to one or more functionalities of the proprietary communication network through the network gateway using the access token.

2. The method of claim 1, wherein the communication channel provides access to voice telephony communication via a telephony functionality of the proprietary communication network.

3. The method of claim 1, further comprising:
   receiving, at the NaaS SDK from the third-party application, a call initiation command to initiate a call between the client device and a recipient via the proprietary communication network;
   generating, by the NaaS SDK, a call initiation message based upon the call initiation command, wherein the call initiation message uses a protocol specific to the proprietary communication network;
   sending, to the network gateway via the communication channel, the call initiation message in order to initiate the call;
   receiving, at the NaaS SDK from the network gateway via the communication channel, a connection confirmation message indicating establishment of a media connection for the call using the one or more functionalities of the proprietary communication network; and
   communicating, between the third-party application and the recipient, communication data via the media connection.

4. The method of claim 3, further comprising:
   receiving, at the NaaS SDK from the third-party application, a command to place the call on hold;
   generating, by the NaaS SDK, a hold call message based upon the command, wherein the hold call message uses the protocol specific to the proprietary communication network; and
   sending, to the network gateway via the communication channel, the hold call message in order to cause the network gateway to place the call on hold.

5. The method of claim 1, further comprising:
   receive, at the NaaS SDK from the network gateway via the communication channel, a call invitation notification indicating an incoming call from another user device;
   sending, to the third-party application from the NaaS SDK, an incoming call notification for presentation to a user of the client device;
   receiving, at the NaaS SDK from the third-party application, an answer notification indicating the user has elected to answer the incoming call;
   sending, from the NaaS SDK to the network gateway via the communication channel, a connection message indicating the incoming call is being answered;
   receiving, at the NaaS SDK from the network gateway via the communication channel, a connection acknowledgement message indicating establishment of a media connection for the incoming call using the one or more functionalities of the proprietary communication network; and
   communicating, between the third-party application and the other user device, communication data via the media connection.

6. The method of claim 1, further comprising:
   receiving, at the NaaS SDK from the third-party application, a text message command to send a text message from the client device to a recipient via the proprietary communication network, wherein the text message commanding includes message content to be sent to the recipient;
   generating, by the NaaS SDK, a text transmission message based upon the text message command, wherein the text transmission message uses a protocol specific to the proprietary communication network and includes the message content;
   sending, to the network gateway via the communication channel, the text transmission message in order to send the text message to the recipient;
   receiving, at the NaaS SDK from the network gateway via the communication channel, a status notification message indicating one or more of a delivery status or a read status of the text message; and
   sending, to the third-party application from the NaaS SDK, a status notification indicating the one or more of the delivery status or the read status of the text message.

7. The method of claim 1, wherein obtaining the access token includes:
   receiving, at the client device, user credentials associated with the user account from a user of the client device;
   sending, from the NaaS SDK to an enterprise user interface (EUI), a login message including the user credentials;

receiving, at the NaaS SDK from the EUI, an authorization code for the user account;

transmit, from the NaaS SDK to the network gateway through an application program interface (API) gateway, the authentication request including the authorization code; and receiving, at the NaaS SDK from the API gateway, the access token from the network gateway, wherein the access token is associated with the client device and a communication session.

8. The method of claim 1, further comprising:

sending, from the NaaS SDK to an application program interface (API) gateway, a request for a list of available service lines associated with the user account;

receiving, at the NaaS SDK from the API gateway, the list of available service lines;

presenting, via a user interface of the client device, the list of available service lines to a user of the client device; and receiving, via the user interface of the client device, a selection from the user of the service line.

9. The method of claim 1, wherein establishing the communication channel includes establishing a WebSocket session with a channel address of an endpoint associated with the network gateway.

10. A non-transitory computer readable medium storing executable instructions comprising a network as a service (NaaS) software development kit (SDK) configured to provide a third-party application access to a proprietary communication network, which executable instructions, when executed by one or more processors of a computer system, cause the computer system to:

receive, from the third-party application, a request to establish a communication connection with the proprietary communication network;

obtain an access token associated with a user account by transmitting an authentication request to a network gateway and receiving the access token from the network gateway;

register a service line associated with the user account by transmitting a service line selection request to the network gateway; and establish a communication channel associated with the service line between the computer system and the network gateway, wherein the communication channel provides real-time access to one or more functionalities of the proprietary communication network through the network gateway using the access token.

11. The non-transitory computer readable medium of claim 10, wherein the NaaS SDK includes a WebSocket handler configured to establish the communication channel by establishing a WebSocket session with a channel address of an endpoint associated with the network gateway.

12. The non-transitory computer readable medium of claim 11, wherein the NaaS SDK includes a poller configured to keep the WebSocket session open by polling the proprietary communication network at intervals.

13. The non-transitory computer readable medium of claim 10, wherein the NaaS SDK includes a web authentication broker configured to obtain the access token and register the service line by:

obtaining user credentials associated with the user account;

sending the user credentials to an enterprise user interface (EUI);

receiving an authorization code for the user account;

sending the authorization code to the network gateway through an application program interface (API) gateway;

receiving the access token from the network gateway through the API gateway;

sending a request for a list of available service lines associated with the user account to the API gateway;

receiving the list of available service lines from the API gateway; and transmitting the service line selection request indicating the service line from the list of available service lines to network gateway through the API gateway to register the service line.

14. The non-transitory computer readable medium of claim 10, wherein the NaaS SDK further causes the computer system to establish a media connection for real-time communication using the one or more functionalities of the proprietary communication network.

15. The non-transitory computer readable medium of claim 14, wherein the NaaS SDK includes a signal handler configured to manage communication signal interchange for communication via the media connection according to protocols used by the proprietary communication network.

16. A computer system configured to access a proprietary communication network, comprising:

a processor;

a communication unit configured to transmit and receive electronic data between the computer system and the proprietary communication network; and a program memory storing executable instructions that, when executed by the processor, cause the computer system to:

receive a request to establish a communication connection with the proprietary communication network from a third-party application running on the computer system;

access a network as a service software development kit (NaaS SDK);

obtain, by implementing instructions of the NaaS SDK, an access token associated with a user account by transmitting an authentication request to a network gateway and receiving the access token from the network gateway;

register, by implementing instructions of the NaaS SDK, a service line associated with the user account by transmitting a service line selection request to the network gateway; and establish, by implementing instructions of the NaaS SDK, a communication channel associated with the service line between the computer system and the network gateway, wherein the communication channel provides real-time access to one or more functionalities of the proprietary communication network through the network gateway using the access token.

17. The computer system of claim 16, wherein the communication channel provides access to voice telephony communication via a telephony functionality of the proprietary communication network.

18. The computer system of claim 16, wherein the communication unit is configured to communicate with the proprietary communication network through a digital communication link.

19. The computer system of claim 16, wherein the executable instructions that cause the computer system to obtain the access token cause the computer system to:

receive user credentials associated with the user account from a user of the computer system;

send a login message including the user credentials to an enterprise user interface (EUI);
receive from the EUI an authorization code for the user account;
transmit the authentication request including the authorization code to the network gateway through an application program interface (API) gateway; and
receive the access token from the network gateway through the API gateway.

20. The computer system of claim 19, wherein the access token is associated with the computer system and a communication session.

\* \* \* \* \*